Figure 4:
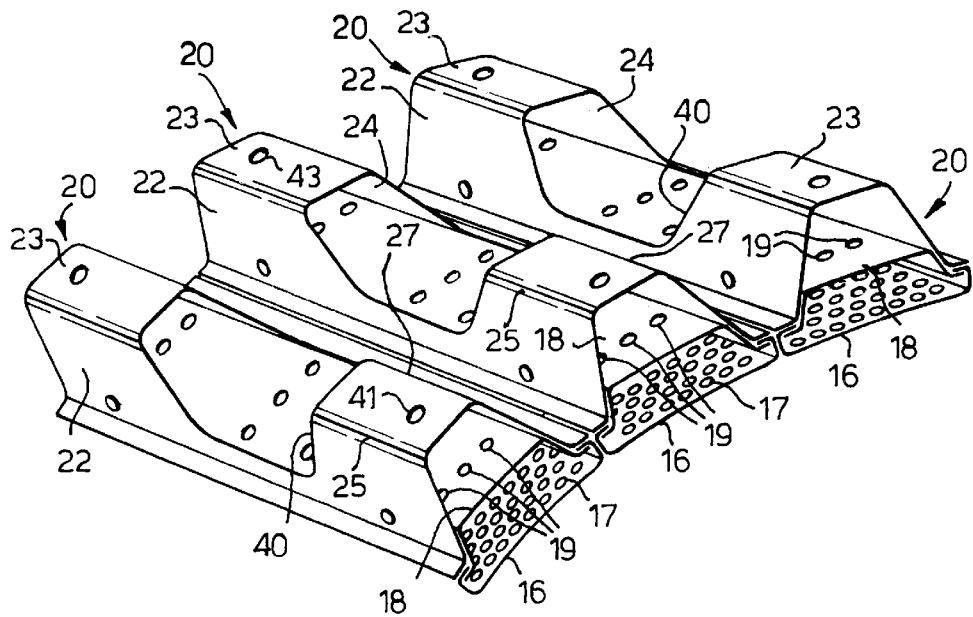

United States Patent [19]
Hayton et al.

[11] Patent Number: 6,041,590
[45] Date of Patent: Mar. 28, 2000

[54] JET PIPE LINER

[75] Inventors: Paul R Hayton, Bristol; Richard A E Bacon, Dursley, both of United Kingdom

[73] Assignee: Rolls-Royce, PLC, London, United Kingdom

[21] Appl. No.: 08/966,974

[22] Filed: Nov. 10, 1997

[30] Foreign Application Priority Data

Nov. 13, 1996 [GB] United Kingdom .................. 9623615

[51] Int. Cl.⁷ .................................................. F04K 3/10
[52] U.S. Cl. .......................................... 60/261; 60/39.32
[58] Field of Search .................. 60/39.32, 261, 60/752

[56] References Cited

U.S. PATENT DOCUMENTS

| | | |
|---|---|---|
| 4,071,194 | 1/1978 | Eckert et al. . |
| 4,854,122 | 1/1989 | Belling . |
| 4,866,942 | 9/1989 | Belling . |
| 5,069,034 | 12/1991 | Jourdain .................................. 60/261 |
| 5,435,139 | 7/1995 | Pidcock .................................. 60/757 |
| 5,697,213 | 12/1997 | Brewer .................................. 60/261 |
| 5,704,208 | 1/1998 | Brewer .................................. 60/261 |
| 5,799,491 | 9/1998 | Bell ........................................ 60/752 |

FOREIGN PATENT DOCUMENTS

| | | |
|---|---|---|
| 2456873 | 6/1975 | Germany ............................. 60/343 |
| 1118257 | 6/1968 | United Kingdom ................ 60/341 |
| 1480743 | 7/1977 | United Kingdom . |
| 1484484 | 9/1977 | United Kingdom . |

*Primary Examiner*—Timothy S. Thorpe
*Assistant Examiner*—Ehud Gartenberg
*Attorney, Agent, or Firm*—Oliff & Berstein, PLC

[57] ABSTRACT

A jet pipe liner for a gas turbine engine comprises of an inner skin consisting of a multiplicity of longitudinally extending sections arranged edge-to-edge in a circumferential direction and suspended along their edges by a multiplicity of longitudinally extending A-frame members. The supporting members are attached to the inside of the jet pipe and the inner skin sections are clamped along their long edges by double-skinned distal ends of the links of the A-frame members.

10 Claims, 5 Drawing Sheets

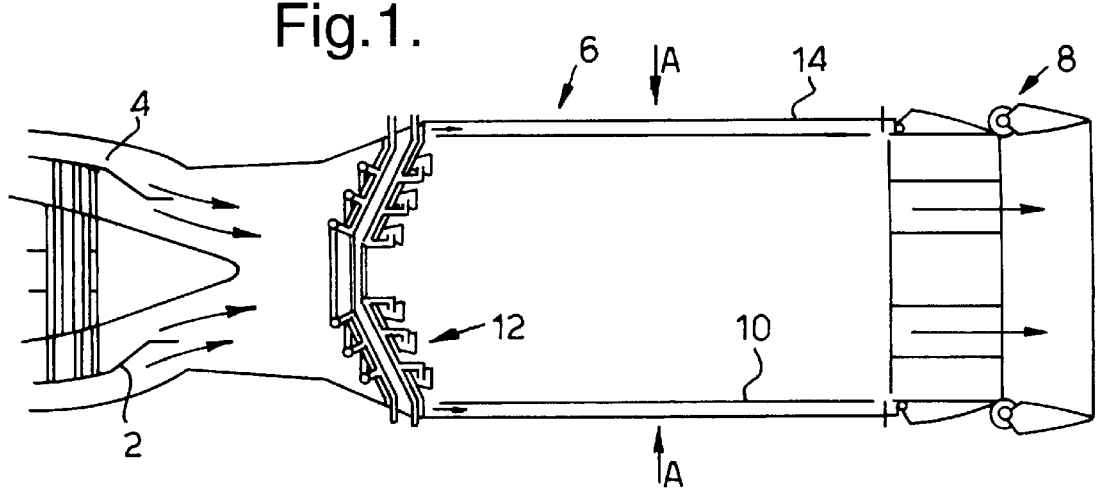
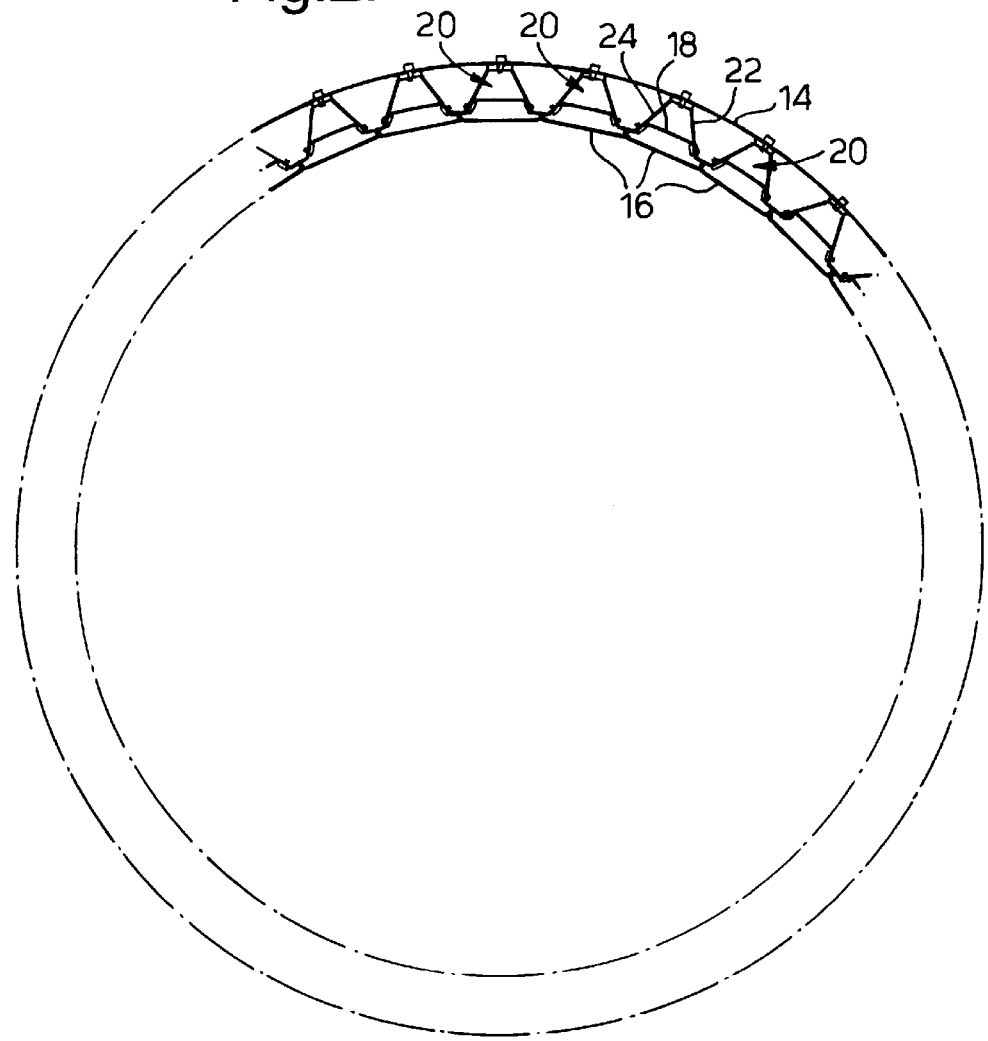

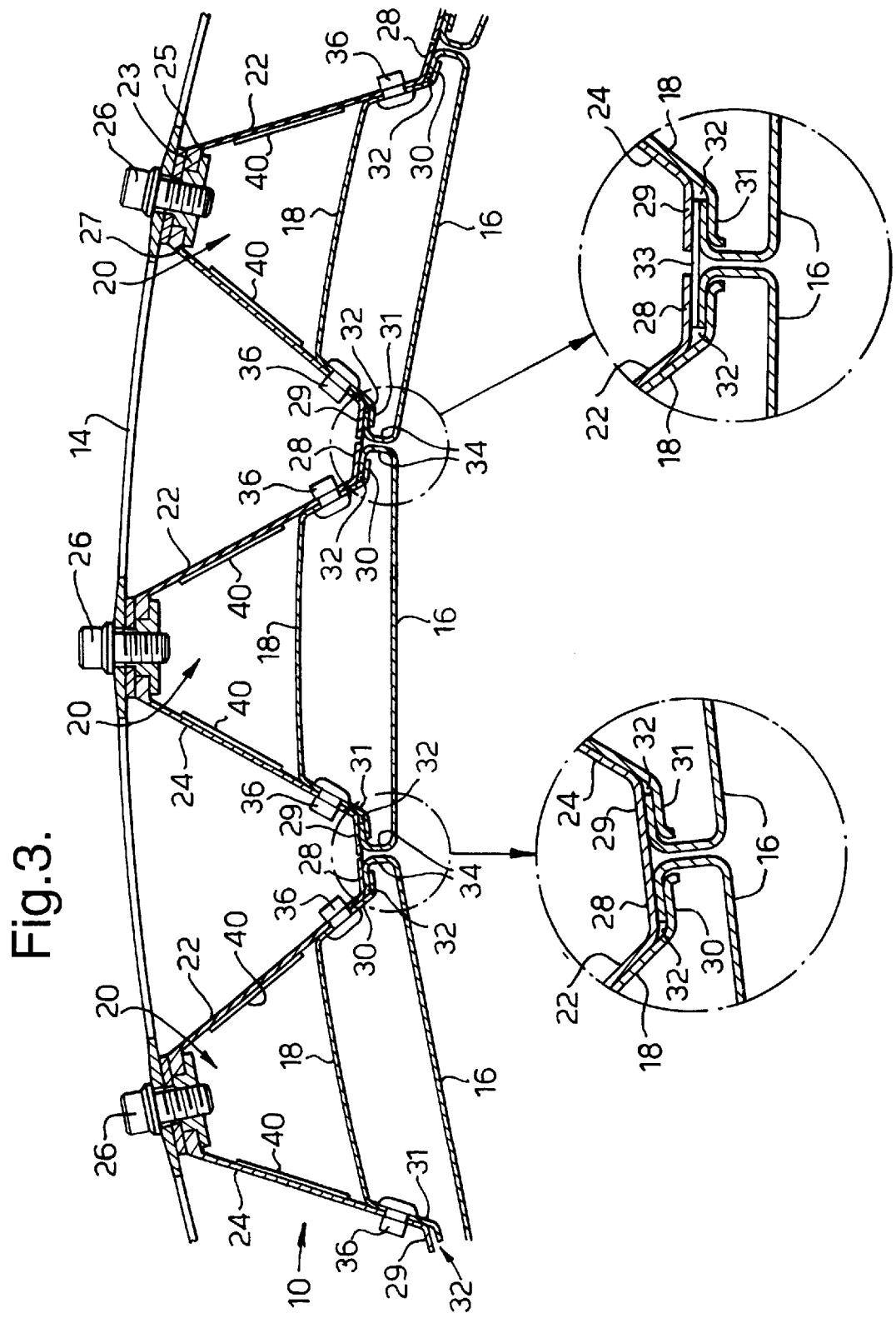

Fig. 8a. (VIEW ON YY)
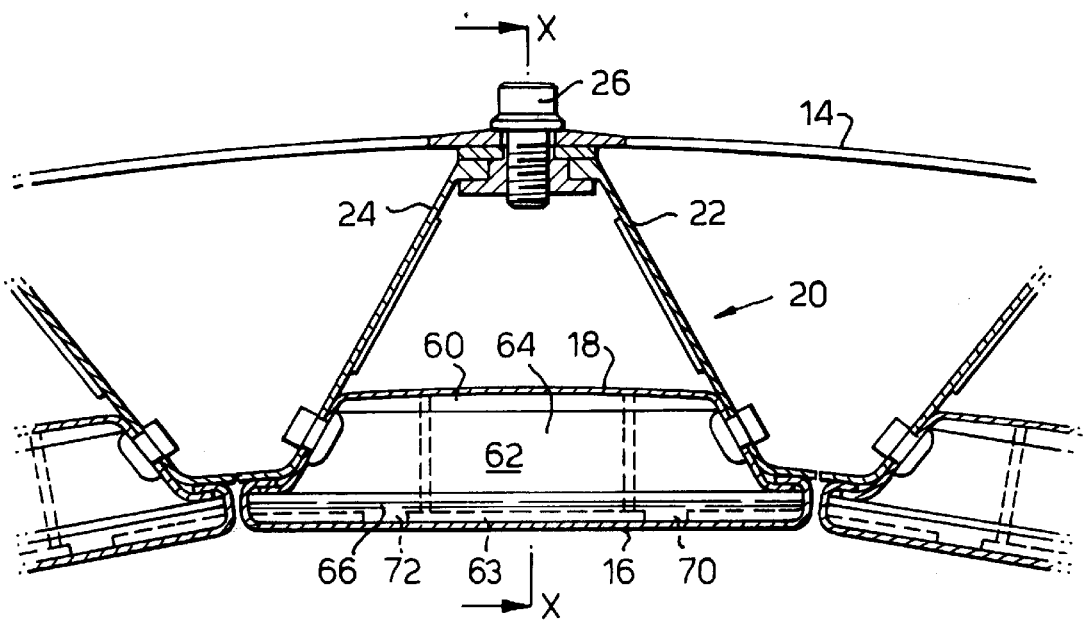
Fig. 8b. (VIEW XX)
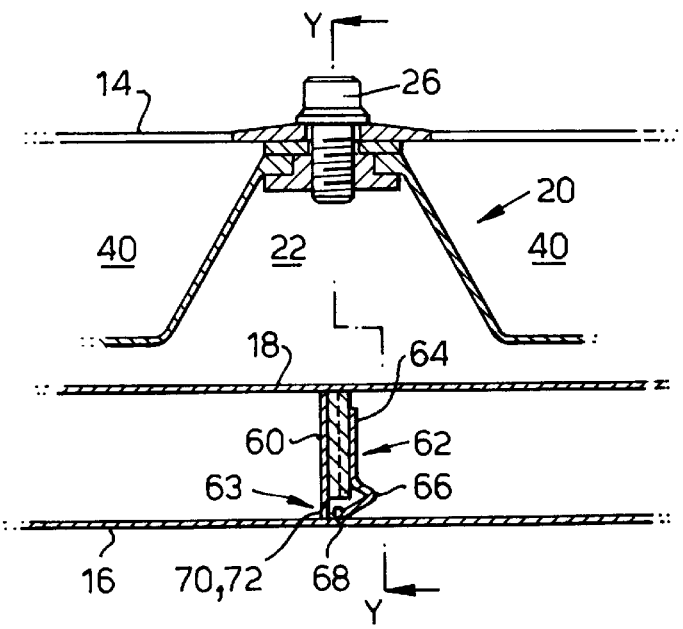

JET PIPE LINER

The invention concerns a jet pipe liner. In particular, the invention relates to the construction of the jet pipe liner and the manner in which the inner skin of the liner is suspended from the jet pipe.

A jet pipe forms part of the exhaust system of a gas turbine engine which passes high temperature turbine exhaust gas to atmosphere at a velocity, and in the required direction, to provide a resultant thrust. The cross-sectional area of the jet pipe, together with the final outlet nozzle affect amongst other things mass airflow and the velocity and pressure of the exhaust stream. The temperature of the gas entering the exhaust system is typically somewhere in the temperature range 600–900° C. but with the use of afterburning this can easily double to 1500° C. or higher. Therefore, it is necessary to employ a form of construction for the jet pipe assembly, together with suitable materials, which will resist distortion and cracking, and will minimise heat conduction to the aircraft structure. Furthermore, since jet pressures in the jet pipe may vary considerably, sometimes with near step changes such as, for example, as the result of an afterburner flame-out, the construction must possess sufficient inherent strength to resist the resulting pressure differentials.

The jet pipe and liner assembly essentially consists of an outer casing, which forms a pressure vessel, and an inner liner which is usually cooled by bypass air and which shields the casing from the high temperature exhaust gases. However, the same problems afflict the liner which also has to meet the above design criteria. The present invention therefore has for an objective to provide a jet pipe liner structure which is stiff enough to withstand the differential pressure loads while being able to accommodate thermal expansion in all directions.

According to the present invention there is provided a jet pipe liner for the exhaust duct of a gas turbine engine includes a double-layer structure comprising a first, outer layer which is spaced radially inwardly from the jet pipe and is carried by support means in the interior f the jet pipe, and a second, inner layer formed by a plurality of axially extending skin segments arranged in edge-to-edge abutment in a circumferential direction and suspended from the first layer.

Preferably the support means comprises a multiplicity of support means spaced apart around the interior of the jet pipe.

Figure 5:
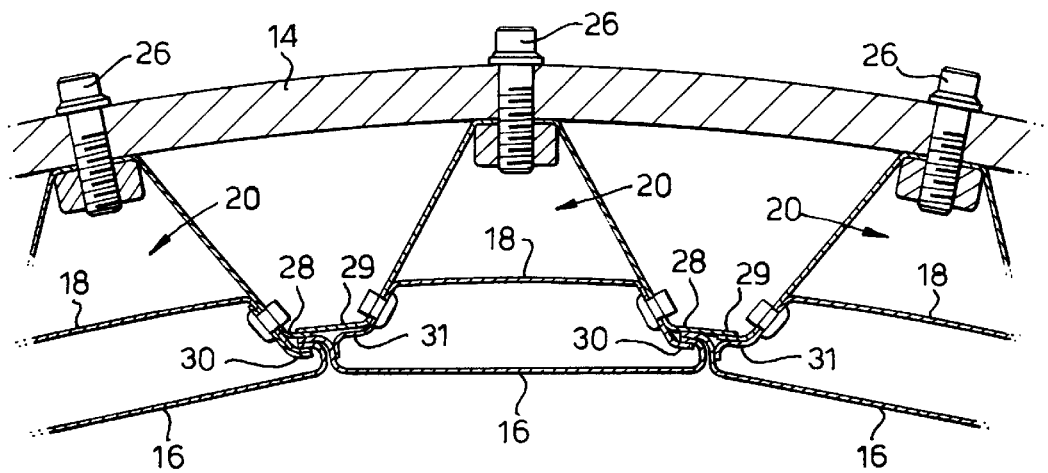
Figure 6:
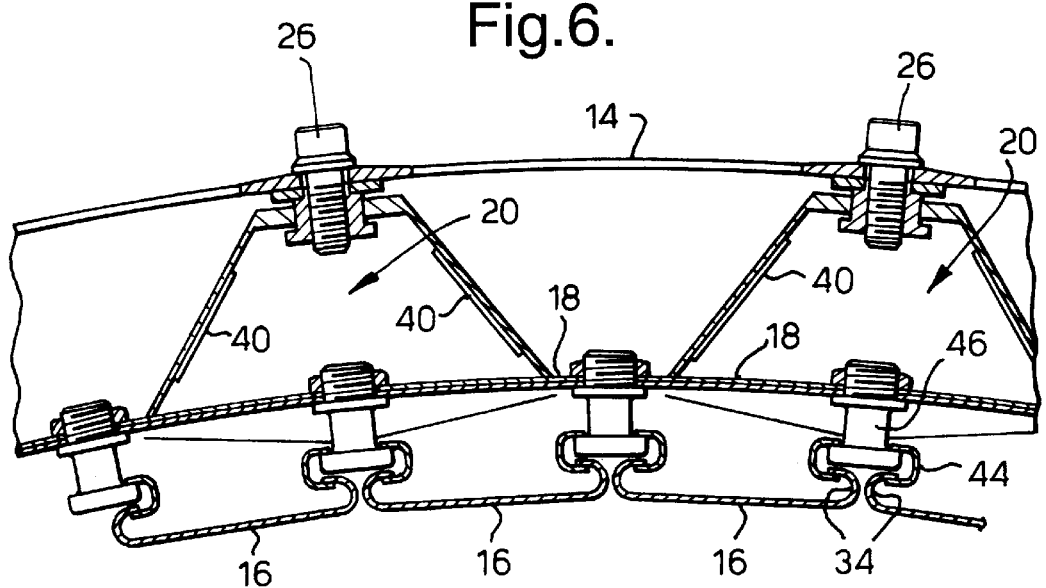
Figure 7:
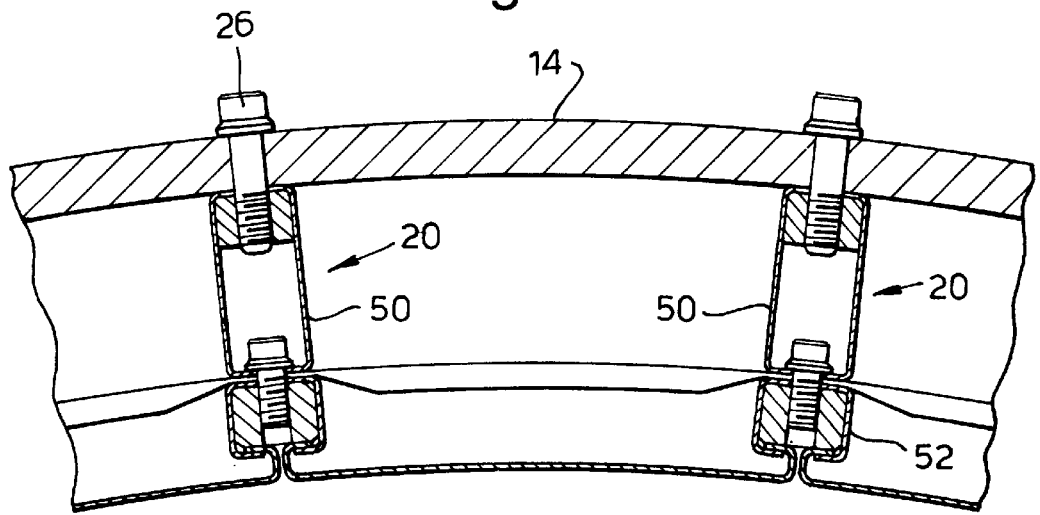

The invention, and how it may be carried into practice, will now be described in greater detail with reference to the accompanying drawings, in which:

FIG. 1 shows a schematic illustration of the turbine exhaust, jet pipe and final nozzle of a gas turbine engine, FIG. 2 shows a section view on A—A of FIG. 1, and FIG. 3 shows a detailed view of the construction of the jet pipe liner and A-frame supporting structure of FIG. 2, FIG. 4 shows a perspective view of the detail arrangement of FIG. 3, FIG. 5 shows a variation of the liner arrangement of FIGS. 3 and 4, FIG. 6 shows a further variation of the liner arrangement, FIG. 7 shows another arrangement utilising a box member supporting structure, and FIGS. 8a and 8b show in detail view an inter-layer baffle.

In the drawings like parts carry like references. Overall, FIG. 1 is intended to convey the size and general location of the jet pipe liner of the invention. FIG. 2 shows the whole annulus of the jet pipe with the liner mounted concentrically inside the main duct, since it lacks specific detail because of the scale of the drawing it may be considered as generic for all of the embodiments. The drawings of FIGS. 3, 5, 6 and 7 show several different arrangements or embodiments of the liner supporting structures and for the mountings of the double-layer liner skins. FIG. 4 shows a perspective view of a portion of the liner of FIG. 3 but which, after making the necessary changes in respect of the suspension arrangement of the inner skin, could apply to the other embodiments.

Several jet pipe liner constructions are illustrated in the accompanying drawings and described below. These all embody the general principles of the present invention which are thereby illustrated by way of example. It will be immediately apparent that further constructional arrangements embodying the same principles may be conceived within the scope of the appended claims.

The liner constructions all have in common a double-layer skin arrangement which is spaced a short distance from the internal surface of the jet pipe itself. The radially outer of these double skins defines an annular space adjacent the interior surface of the jet pipe which is fed at one axial end with relatively cool bypass air, see FIG. 1. This outer skin is attached to the jet pipe by support means fixed to its interior. There are plurality of such support means spaced apart axially and circumferentially around the jet pipe. The inner of the two skins is relatively loosely suspended from the outer skin. Generally, to accommodate thermal expansion, the support means is anchored to the jet pipe in an annulus at one end of the liner and the liner is allowed to expand linearly in an axial direction relative to the jet pipe casing by the remaining attachment points suitably adapted. The A-frame construction is inherently tolerant of circumferential expansion, and contraction. For axial stiffness the support means extends substantially the full length of the liner and they are either attached to the outer of the double skins along their whole length or at a large number of locations. In order to avoid circumferential pressure differentials the panels or members which comprise the support means are perforate, e.g. pierced by a large number of apertures to permit pressure equalisation. However, to avoid the problem of differential thermal expansion effects causing buckling in the panels themselves an arrangement is preferred in which the panels are discontinuous towards their relatively cooler sides. This also assists in promoting the flow of air to cool the liner thereby helping to avoid hot spots.

The problem of afterburner noise is also tackled by allowing a certain amount of air flow through the double layers of the liner skins. As is known a significant degree of afterburner, or reheat, noise damping can be achieved with a perforated liner between the reheat combustion region on one side and the cooler bypass airflow on the other side. This feature is present in the illustrated arrangements of the present invention where the skin panels are perforated by a very large number of holes. These holes perform several functions, for example, the said afterburner screech damping, and metering of the airflow through the two layers for pressure control and cooling. The holes in both layers are of reasonably small diameter, typically a few millimeters. For the purposes of effective screech damping a layer of air is trapped between the two skin panels. Pressure waves from the exhaust stream propagate through the holes in the inner skin panel into the trapped layer. The holes in the outer skin panel are sized to control further propagation of the sound waves by effectively trapping the air at the frequencies of concern. The criteria for effective entrapment of the air is that the total aperture area of the holes in a radially outer skin is less than the corresponding total aperture area in an inner skin panel. Also, the holes in the outer skin panel act to meter airflow into the inter-layer region and, thus also through the inner skin panel. This means that the radially outer skin panel is also subject to a greater proportion of any pressure gradient experienced, and thus any pressure loading is developed across the outer skin of the double-layers and the loads are transferred directly by the support means to the jet pipe casing.

A substantial differential thermal expansion of the jet pipe liner relative to the jet pipe casing in both axial and circumferential directions also occurs. The axial growth is accommodated by fixing the jet pipe liner to the casing at one of its ends and arranging the remaining support means to allow sufficient axial elongation. Circumferential growth is compensated by axially extending thermal breaks which divide the liner into several sections spaced apart by narrow circumferential gaps to absorb the growth by allowing for relative movement. Seals are provided between these sections to control leakage and preserve the integrity of the functions of the liner, especially those of flow control and screech damping.

Referring now to the drawings, and firstly to FIG. 1 the turbine exhaust 2 of a bypass gas turbine engine is shown towards the left of the drawing. The downstream end of the bypass duct is shown at 4 and these two gas streams pass into a jet pipe indicated generally at 6, and from there to a final exhaust nozzle 8. The jet pipe assembly 6 includes a jet pipe liner 10, represented by a single inner skin. An afterburner assembly 12 is shown towards the upstream end of the jet pipe 6.

The jet pipe assembly comprises an outer casing 14 which forms an outer pressure vessel and the inner liner 10. The liner 10 functions as a barrier cooled by a proportion of the bypass duct flow and isolates the casing 14 from the high temperature turbine exhaust gases. The bypass cooling air is fed to the annular volume between the casing 14 and the inner skin of the liner 10, which will be described further below, and provides damping of afterburner screech in addition to cooling of the structure. Under normal conditions there is a modest pressure difference across the liner 10 but, if an afterburner flame-out occurs the hot exhaust stream pressure collapses causing a large inward pressure loading on the liner assembly. The particular liner construction illustrated in more detail in FIGS. 2, 3 and 4 is designed to be stiff enough to withstand this pressure load while, at the same time, having sufficient flexibility to accommodate differential thermal expansion in all directions which takes place as a result of the differences in temperatures of the several part of the liner construction.

Referring now to FIGS. 2 and to the first of the embodiments shown in FIG. 3 the jet pipe liner 10 consists of a double-layer construction comprising an inner skin 16 and an outer skin 18. The liner assembly is divided into a number of separate segments or sections which are attached directly to the jet pipe casing 14, these separate segments make up a multiplicity of longitudinally extending sections mounted in edge-to-edge abutment to form a complete annular or cylindrical inner liner skin. The abutting edges of the segments are not forced together in the cold build condition, but sufficient clearance is left to allow for thermal growth and movement. The sections are suspended from the inside of the jet pipe casing 14 by a plurality of support means comprising, in this example, of longitudinally extending A-frame assemblies generally indicated by references 20. Each inner skin segment 16 extends longitudinally parallel to the axis of the jet pipe 6 and is suspended from an A-frame assembly, generally indicated at 20, along its longitudinal edges.

The A-frame members essentially consist of two longitudinally extending side panels 22, 24 which are joined along an apex 23 of the A-frame which is placed adjacent the inner surface of the casing 14 and attached thereto at intervals by bolts 26. In a first form of this construction the two panels 22, 24 were formed from a single sheet of metal folded lengthways along two closely spaced creases 25, 27 to form the apex 23 of sufficient width to receive the support means 26. In similar fashion the two side panels 22, 24 and apex 23 could be formed separately and joined, for example by welding. However, this form of construction results in a continuous panel lying alongside the relatively cool jet pipe wall, while the distal edges of the panels which support the skin panels 16, 18 are bathed in hot gas. Consequently the side panels experience a substantial temperature difference between their inner and outer edges leading to differential thermal expansion effects which may cause buckling to occur. In order to avoid these detrimental effects a preferred configuration illustrated in FIG. 4 was adopted. In this the side panels 22, 24 and the apex 23 are still made from a single sheet of metal which is folded along two crease lines 25, 27. However, the centre portion of the sheet, which form the apex 23, has a series of large cut-outs 40 along the centreline so that the line of the apex of the composite frame is discontinuous, and each of the attachment locations 41, 43 for a support means 26 is located in a separate land along the apex. Thus, differential thermal expansion between the hottest and coldest parts of the panels is virtually totally eliminated.

The panels 22, 24 form the limbs of the A-frame and are joined towards their distal ends by further longitudinally extending segments 18. The segments 18 form a second, radially outer skin, parallel to and spaced radially apart from the first, radially inner skin segments 16. The margins 30,31 of the segments 18 are bent to conform to the margins 28,29 of the A-frame panels 22,24, (the references 30,31 are allotted to the right- and left-hand sides of the segments 18 as viewed in the plane of the drawing). The drawing includes an enlargement of these details for ease of reference. The outer most edges of the margins 28,29 of panels 22,24 and of the margins 30,31 of segments 18 are bent-over to extend in circumferential directions (again the references 28,29 are allotted to the distal edges of the right- and left-hand A-frame panels 22, 24 as viewed in the plane of the drawing). The dimensions of the facets of the panels 22,24 and segments 18 are chosen such when assembled together, as shown in FIG. 3, the edges lie parallel, extending in the circumferential direction, and spaced apart to form a narrow, axially extending slot 32 running along each of the edges of the A-frame assemblies 20. The margins 34 of the skin segments 16 are received into these slots 32 to mount the segments as the inner skin of the double-skinned liner. The A-frame panels 22,24 and the segments 18 are secured together, in their conformal regions by seam or spot welding or, as illustrated, by rivets 36 spaced apart in the axial direction.

As mentioned above the support means are provided with thermal breaks to accommodate circumferential expansion. These are more clearly shown in the detailed inserts of FIG. 3. The right-hand insert shows such a thermal break arrangement in which the neighbouring margins 28,29 of the adjacent A-frame panels are simply separated by a narrow gap which is sealed against gas leakage by a flat seal strip 33 inserted into both opposing slots 32 spanning the gap between neighbouring edges of the segments 16. The left-hand detail insert shows the normal arrangement in which the A-frame edges 28,29 are either joined or formed integrally so as to be continuous. The A-frames may be constructed of discrete panels joined together or the several between thermal breaks may be formed from a single sheet corrugated to form the shape required for the support means.

Longitudinal or axial expansion is accommodated by arranging for the support means to fixedly mount the double-layer liner to the interior of the jet pipe, and to allow limited relative movement at the remaining, axially separated support mounting points. FIG. 4 clearly shows both kinds of holes 41, 43 in the surfaces of the A-frame support means which are abutted to the interior of the jet pipe casing when the liner assembly is bolted into position. The illustration shows round holes 41 towards the near end of the support means 20 through the fixed end mounting bolts 26 are passed. Further away, in the relative perspective of the drawing, the next ring of mounting holes 43 is shown slightly elongate in the axial direction to accommodate axial growth. The method of attaching the support means to the interior of the jet pipe using bolts 26 is capable of allowing the consequent sliding movement in order to avoid introducing another mechanism for causing buckling of the support members. For the purposes of this description it is assumed that the several arrangements of support means are attached to the jet pipe in similar manner.

The margins 34 of the skin segments 16 are bent over into inward facing C-shaped so that the long edges of a segment 16 are formed with inward facing lips which are adapted to engage the slots 32. On assembly the skin segments 16 are offered up to the A-frame members at one end with the C-shaped margins 34 engaged in the slots formed by the A-frame margins 30,32 and the skin segment 16 is slid longitudinally into place. Preferably the innermost segments 16 are not secured in place by welds or rivets etc., rather these segments are suspended solely by the interlocking engagement of the panel sides and skin edges, thereby allowing an amount of differential thermal expansion to take place without causing buckling or distortion of the liner skin. The inner skin segments 16 are able to act together with the radially outer skin segments 18 to form a noise damping and thermally insulating barrier.

As will be apparent from FIG. 2 these liner segments are mounted on the inside of jet pipe casing 14 with the longitudinally extending edges 28 of the A-frame and the U-shaped margins of inner skin segment 16 of neighbouring segments in edge-to-edge abutment. The inner skin in the form of these axially extending strips or segments 16 are thus free to expand axially and circumferentially relative to the outer skin segments or strips 18.

As described above and as illustrated in FIG. 4 the A-frame panels 22,24 are formed with a number of holes or apertures 40 (only one aperture is referenced in each leg of the support means for clarity), which allow free movement of cooling air in transverse, or circumferential directions, around the annular volume between the jet pipe casing 14 and the inner skin 16. The inner skin segments 16 are perforated by a large number of small diameter holes 17 which allow cooling air to pass through the skin to establish a cooling film on the surface of the liner exposed to the hot gas path. These holes as allow afterburner pressure waves to enter the inter-layer volume to act as afterburner screech damping holes. Typically those holes are of the order of a millimeter or so in diameter. The holes 19 in the radially outer skin panel 18 are arranged to have a total aperture area less than the total aperture area of the holes 17 in the inner panel so that the outer panel performs a metering function controlling the rate of airflow through the liner panels. It is preferred to have fewer outer panel holes 19 so that these have a larger diameter. By carefully selecting the size and position of these holes they are able to fulfil an additional function of generating an impingement jet of cooling air directed at the face of the inner panel. The columns of cooling air thus produced can be arranged to spread out across the faces of the panels and to reach the margins adjacent to the A-frame attachment points.

However, the A-frames may be made up the apertures which pierce the sides of the panels admit airflow into the regions enclosed by the corrugations. This construction provides substantially unimpeded circumferential airflow thereby avoiding local thermal hotspots and pressure variations around the annulus. The small holes 19 in the outer skin 18 are smaller than the holes 17 in the inner skin 16. In some instances it may not be desirable to allow unrestricted circumferential flow, in which case an occasional one of the longitudinally extending panels may be blanked-off or left unpierced.

FIG. 5 shows an alternative arrangement which employs similar A-frame support means but in which the inner skin segments 16 are supported in a modified manner. The edges of the segments 16 are no longer symmetrical but are handed and arranged so that opposing edges of adjacent segments overlap one over the other and are pinched together between the slot framing edges 28 and 30 on one side of an A-frame support 20. The opposite pair of edges 29,31 on the adjacent support frames are closed up, since they no longer have to form a receiving slot for a margin of a segment 16. Instead the radially inner edge 31, of the pair, is bent over to form a stop to retain the segments in position and to form a seal against a neighbouring support.

FIG. 6 shows another arrangement for suspending to inner segments 16 in which the segment rays are formed with C-shaped edges 34(similar to those in the arrangement of FIG. 3). Elongate C-section clamp members 44 engage the edges of the segments 16 and, in turn, these members 44 are carried by pegs 46 bolted to the underside of the outer skin layer 18. In the illustrated arrangement the circumferential width of the segments 16 is equal to half the pitch of the A-frame support means.

FIG. 7 shows a further arrangement in which the support means comprises elongate box-lie members 50 to attach the double-layer structure to the jet pipe casing 14. Again to promote circumferential flow of the box-like members 50 have a plurality of apertures formed in their radial sides. The double layer structure is suspended for the radially undersides of the members 50. Essentially the outer layer 18 is clamped between channel section members 52 and the underside of the members 50. The radially inner face of the channel section members 52 are framed with open slots to receive the C-shaped edges of the inner skin segment or trays 16.

It is possible, in some circumstances, that an axial pressure gradient may occur in the hot gas path as a result of which an uneven film cooling flow may be produced through the holes 17 in the inner panel 16. That is, an axial pressure gradient may occur along the length of the jet pipe such that a pressure differential is established in the inter-panel space which results in a bias in the film cooling flow through panel 16 towards one of the liner assembly. It is preferred, therefore, to insert and occasional transverse baffle in the inter-panel spaces between the panels 16, 18 as illustrated in the drawings of FIGS. 8a and 8b. One baffle arrangement is shown in the mutually orthogonal views of FIGS. 8a and 8b.

The baffle comprises plate 60 attached to the radially inner face of the outer panel 18. This plate extends between the inward faces of the side panels 22, 24 and may be attached on these three sides to the adjacent panels by welding for example. However, the plate cannot extend the full depth of the inter-panel volume so that the panel 16 can remain capable of axial sliding movement relative to the supporting frame members 22, 24. Clearly, therefore, the plate 60 should not be deliberately attached to the panel 16, but neither should it be allowed to jam against the panel or the same result may occur. Thus, a clearance gap is left between the fixed plate 60 and the adjacent panel 16 and a separate spring seal, generally indicated at 62, is provided.

This seal 62 basically comprises a flat portion 64 which extends across the inter-panel space and is attached to the plate 60 for support. The clearance gap 63 is seal by a pleated portion 66 extending along the adjacent edge of the portion 64. To form this pleated portion 66 a margin of the flat portion is bent upwards and is folded back upon itself. The material from which the seal is made possesses sufficient inherent resilience to spring a lip 68 on the margin of the seal in outward direction. When assembled the lip 68 of the pleated portion 66 is thus urged against the inside face of the panel 16. In order to prevent the spring seal closing completely during some thermal movements, for example as a result of buckling should it occur, a stop arrangement is built into the support plate 60. Instead of the plate 60 being completely flat it is formed with two steps spaced apart across the width of the plate, and the clearance gap edges of the plate are formed with upstanding tangs 70, 72, the height of which is chosen to provide the necessary protection for the pleated portion 66 of the spring 62.

We claim:

1. A jet pipe liner for the exhaust duct of a gas turbine engine includes a double-layer structure comprising a first, outer layer which is spaced radially inwardly from the jet pipe and is carried a multiplicity of support means spaced apart around the interior of the jet pipe, and a second, inner layer formed by a plurality of axially extending skin segments arranged in edge-to-edge abutment in a circumferential direction and suspended from the first layer, wherein the multiplicity of support means which carry the first, outer layer are adapted to accommodate differential thermal expansion of said layer relative to the jet pipe.

2. A jet pipe liner as claimed in claim 1 wherein several of the multiplicity of support means are arranged to secure the first layer at one end in a fixed axial relationship with respect to the jet pipe and wherein the remainder of the support means allow relative thermal expansion.

3. A jet pipe liner as claimed in claim 1 wherein the plurality of axially extending skin segments comprising the second, inner layer are suspended from the first layer by an arrangement tolerant of differential thermal expansion.

4. A jet pipe liner as claimed in claim 3 wherein the longitudinally extending skin segments of the second, inner layer have longitudinal edges adapted to engage portions of the first, outer layer whereby the inner layer is suspended from the outer layer.

5. A jet pipe liner as claimed in claim 1 wherein the support means comprises a multiplicity of axially extending A-frames spaced apart around the interior of the jet pipe and the axially extending skin segments are suspended from the distal ends of the limbs of the A-frames.

6. A jet pipe liner as claimed in claim 5 wherein the first, outer layer comprises a multiplicity of panel members which are attached to the A-frames to form the cross-pieces thereof and which extend the length of the frames.

7. A jet pipe liner as claimed in claim 1 wherein the support means comprises a multiplicity of axially extending elongate box members attached to the interior of the jet pipe and which carry on their radially inner sides the second, inner skin segments.

8. A jet pipe liner as claimed in claim 1 wherein the first and second skin panels are perforated by a large number of small airflow holes.

9. A jet pipe liner as claimed in claim 8 wherein the first, outer skin layer is formed with a large number of small holes such that the first layer function s to meter airflow into the space between the two skin layers.

10. A jet pipe liner as claimed in claim 8 wherein the space between the first and second skin layers, in use, function as a jet pipe screech damper.

* * * * *